United States Patent [19]
Mitamura

[11] Patent Number: 5,760,869
[45] Date of Patent: Jun. 2, 1998

[54] EYEGLASSES FRAME WITH SPRING HINGES

[75] Inventor: Minoru Mitamura, Fukui, Japan

[73] Assignee: Eyetec Co., Ltd., Sabae, Japan

[21] Appl. No.: 838,230

[22] Filed: Apr. 16, 1997

[30] Foreign Application Priority Data

May 13, 1996 [JP] Japan ................... 8-143555

[51] Int. Cl.$^6$ ............... G02C 5/22; G02C 5/16
[52] U.S. Cl. ............... 351/153; 351/113; 16/228
[58] Field of Search ............... 351/113, 114, 351/119, 121, 153; 16/228

[56] References Cited

U.S. PATENT DOCUMENTS

| | | | |
|---|---|---|---|
| 4,689,851 | 9/1987 | Beyer | 16/228 |
| 5,483,302 | 1/1996 | Jaffelin | 351/113 |
| 5,671,036 | 9/1997 | Huang | 351/113 |

Primary Examiner—Huy Mai
Attorney, Agent, or Firm—Nikaido, Marmelstein, Murray & Oram LLP

[57] ABSTRACT

A coil spring is held in a compressed state between a forward end side of an elastic member compartment of a temple and a working face of a cover. A plate spring which is folded in two is held in a concave part of the cover so that a side closer to a base end portion of the temple is open, with one of two open forward ends of the plate spring engaged with a step on a bottom surface of the elastic member compartment for preventing the cover from being slid toward the base end portion of the temple and slipping off. An outer end surface on a base end portion side of the cover is in contact with a forward end surface of a rim in a normal use position. The cover is pushed by the forward end surface of the rim when the temple is further spread beyond the normal use position, to be slid toward the forward end along a guide member of the temple while compressing the coil spring against its spring force.

5 Claims, 6 Drawing Sheets

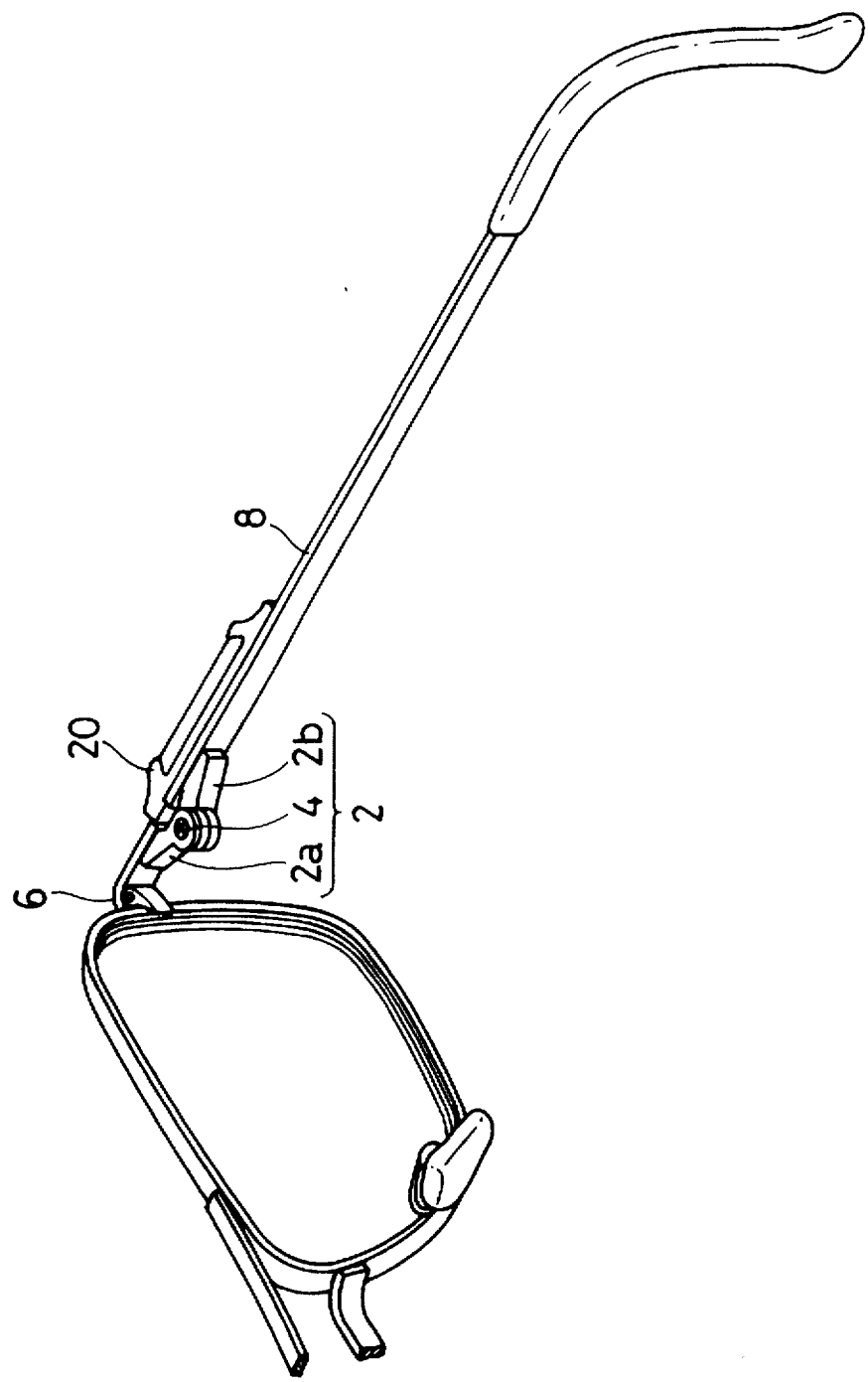

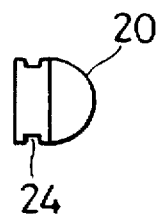
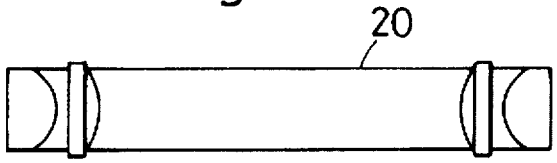
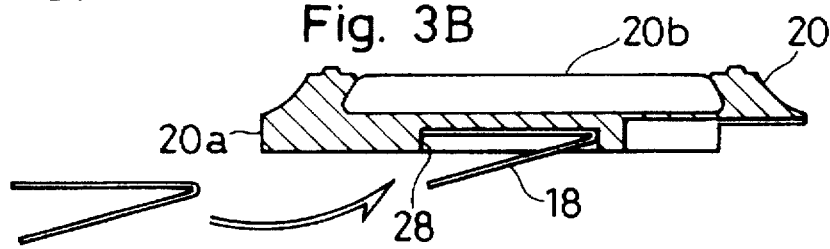
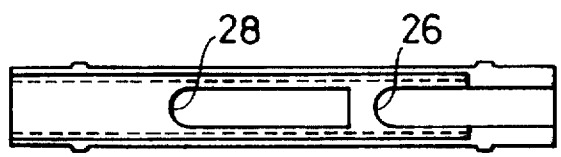
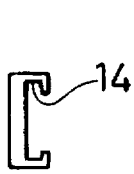
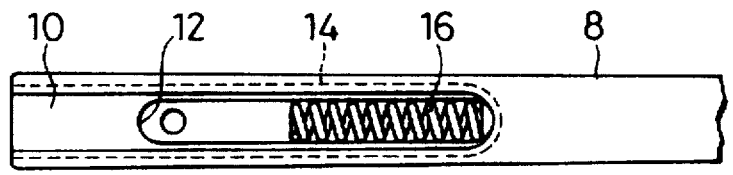
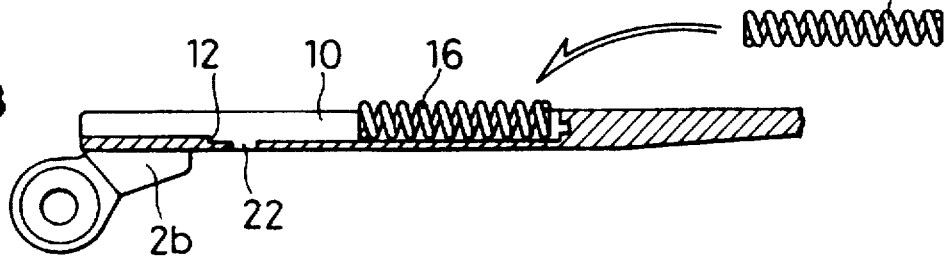
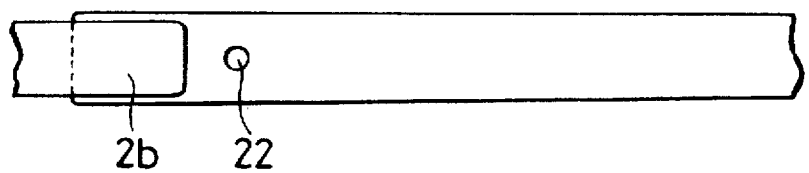

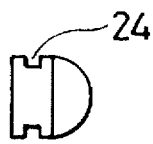 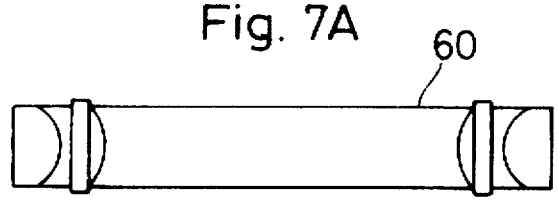
Fig. 7D  Fig. 7A
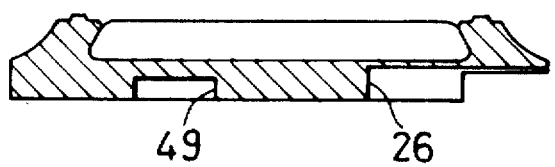
Fig. 7B
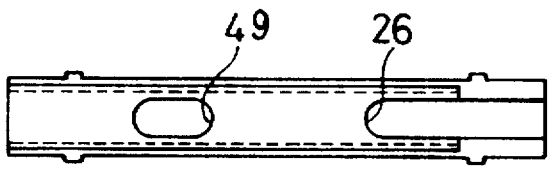
Fig. 7C
 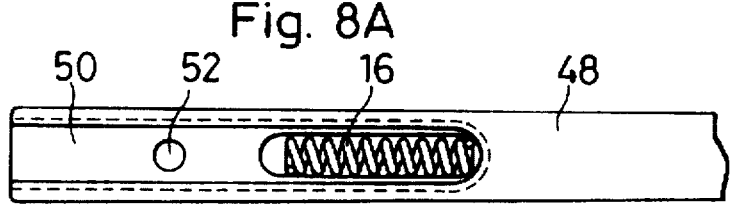
Fig. 8D  Fig. 8A
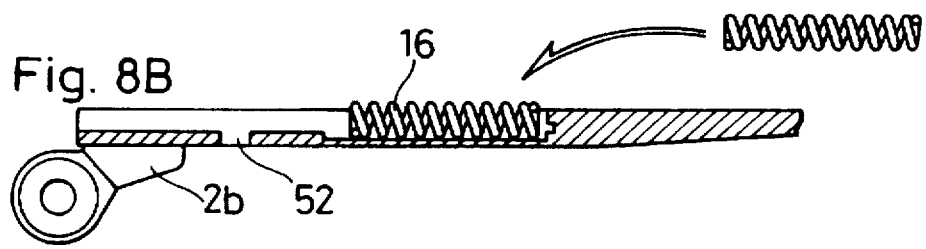
Fig. 8B
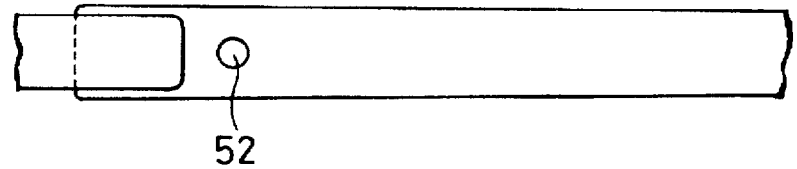
Fig. 8C

EYEGLASSES FRAME WITH SPRING HINGES

BACKGROUND OF THE INVENTION

The present invention relates to a frame of eyeglasses with spring hinges which allow a wearer of eyeglasses to spread each temple thereof against spring force beyond a position contacting his head.

In order to improve the fit of eyeglasses while preventing each hinge from loosening, a spring hinge which allows the wearer to spread each temple beyond a position of normal use against spring force is used.

For example, a hinge body is integrated with a spring mechanism, so that the hinge body itself comprises the spring (refer to Japanese Patent Publication No. 6-64264 (1994)). In this spring hinge, a rim-side leaf is fixed to the rim, while a temple-side leaf is slidably mounted on the temple in a guide groove provided on a base end portion of the temple. A coil spring and a block member which serves as a stop member for the coil spring are inserted in the base end portion of the temple, so that the temple is slidable with respect to the temple-side leaf against spring force.

In assembling of the spring hinge, the temple-side leaf of the hinge body is combined with the temple base end portion so that the coil spring is introduced into a clearance defined therebetween. The block member is inserted such that its projection is engaged in and fixed to a notch which is formed in the guide groove of the temple. Thereafter the temple-side leaf is coupled with the rim-side leaf, thereby completing the hinge.

In this spring hinge, the hinge body integrated with the spring mechanism must couple the temple base end portion and the rim with each other so that an attitude in a normal use position enters a prescribed position.

In this spring hinge, however, the attitude in the normal use position is easily variable due to working accuracy of parts of the complicated spring mechanism and brazing position accuracy. Such variability must be adjusted by changing brazing positions, leading to troublesomeness. Further, assembling of such a spring hinge is originally troublesome, leading to inferior working efficiency.

In addition, the block member cannot be detached after the same is inserted and fixed. Therefore, it is difficult to repair the hinge when the same is out of order. Although there is a demand for adjustment of eyeglasses for attaining proper fit for the wearer by replacing each coil spring with one having different spring force, this demand cannot be satisfied.

From an opening and closing direction of the temple, the hinge body is provided inside a coupling portion between the rim and the temple. Since the hinge body is integrated with the spring mechanism in the above spring hinge, a spring mechanism having a relatively large volume is provided on the coupling portion for the hinge. Thus, the thickness of a portion around the hinge is increased while the width is also increased, to restrict the design of the eyeglasses. While there is also a demand for an ornament provided on the front side of the temple, it is difficult to provide a stereoscopic ornament on the outer side, due to the spring mechanism provided on the inner side.

SUMMARY OF THE INVENTION

An object of the present invention is to provide an eyeglasses frame with spring hinges having a simplified structure, which are easy to assemble for improving working efficiency.

The hinge according to the present invention comprises a hinge body coupling a temple to a rim with a clearance between a base end portion of the temple and a forward end of the rim coupled therewith, an elastic member compartment having an opening which is provided on an outer side of the temple base end portion communicating with an outer end surface and holding an elastic member so that a side portion of the opening serves as a guide member, a cover closing the opening of the elastic member compartment, which is slidably supported by the guide member of the elastic member compartment on its side portion and has a working face for the elastic member on its forward end side on a surface opposed to the opening of the elastic member compartment so that an outer end surface on a base end portion side comes into contact with the forward end of the rim in a temple attitude in a normal use position, and stop means for preventing the cover from slipping out toward the base end side of the temple. The elastic member is held between a forward end side in the elastic member compartment and the working face of the cover in a compressed state.

The elastic member may be prepared from a spring such as a coil spring or a corrugated plate spring, or made of rubber.

According to the present invention, the temple and the rim are coupled with each other by the hinge body, while the elastic member compartment is provided on the base end portion of the temple so that the temple can be further spread beyond the normal use position against spring force, and the cover covering the elastic member compartment is pressed against the rim with the elastic member such as a coil spring held in the elastic member compartment in a compressed state. Thus, the number of parts may be reduced.

The temple and the rim are directly coupled with each other by the hinge body, whereby brazing positional accuracy for each leaf with respect to the temple and the rim can be readily attained. Variations of the temple attitude in the normal use position can be suppressed and working efficiency of assembling is improved.

The cover, which is provided on the outer side of the base end portion of the temple, can also serve as an ornamental member. Thus, the design can be readily changed by exchanging the cover.

A first example of the stop means comprises a step which is provided on a bottom surface of the opening of the elastic member compartment for defining a higher base end portion side, a concave part which is provided on a base end side of the cover, and a plate spring which is folded in two and held in the concave part of the cover so that a side closer to the temple base end portion is open with one of the open forward ends being engaged with the step on the bottom surface of the opening of the elastic member compartment.

In the hinge comprising this stop means, the elastic member such as a coil spring may be held in the elastic member compartment of the temple so that the plate spring is held in the concave part of the cover in a direction opening a base end portion side and the cover is slid along the guide member and pushed until one of open forward ends of the plate spring is engaged with the step during assembly. Thus, the hinge is extremely easy to assemble.

A hole is preferably provided on a position of a bottom portion around the step in the base end portion of the temple for receiving a pin which can be inserted from the exterior for pushing an end of the plate spring engaged with the step. In this manner, the cover, the elastic member and the plate spring can be readily detached from the temple for simplifying maintenance. In this case, the cover can be readily detached from the temple when the pin is inserted in the hole for pushing an end of the plate spring and disengaging the same from the step in maintenance.

A second example of the stop means comprises a screw hole which is provided on a bottom surface of the opening of the elastic member compartment, a screw which is fitted with the screw hold, and a working face provided on the base end side of the cover for the screw which is fitted with the screw hole of the elastic member compartment.

In the hinge comprising the stop means of the second example, the elastic member may be held in the elastic member compartment of the temple so that the cover is slid along the guide member and pushed until the working face of the cover passes the screw hole and the screw is fitted with the screw hole to be engaged with the working face during assembly. The hinge is extremely easy to assemble also in this case. The temple can be readily detached from the cover by removing the screw, for simple maintenance.

Thus, the hinge according to the present invention has a simple structure, is easy to assemble, and improves working efficiency. Further, maintenance is simplified.

BRIEF DESCRIPTION OF THE DRAWINGS

The foregoing and other objects, features, aspects and advantages of the present invention will become more apparent from the following detailed description of the present invention when taken in conjunction with the accompanying drawings.

FIG. 1 is a perspective view showing a first embodiment of the present invention;

FIGS. 3A to 3D are a plan view, a longitudinal sectional view, a bottom plan view and a left side elevational view showing an unassembled cover of the first embodiment respectively;

FIGS. 4A to 4D are a plan view, a longitudinal sectional view, a bottom plan view and a left side elevational view showing an unassembled temple of the first embodiment respectively;

FIGS. 7A to 7D are a plan view, a longitudinal sectional view, a bottom plan view and a left side elevational view showing an unassembled cover of the second embodiment respectively; and FIGS. 8A to 8D are a plan view, a longitudinal sectional view, a bottom plan view and a left side elevational view showing an unassembled temple of the second embodiment respectively.

DESCRIPTION OF THE PREFERRED EMBODIMENTS

Figure 2A:
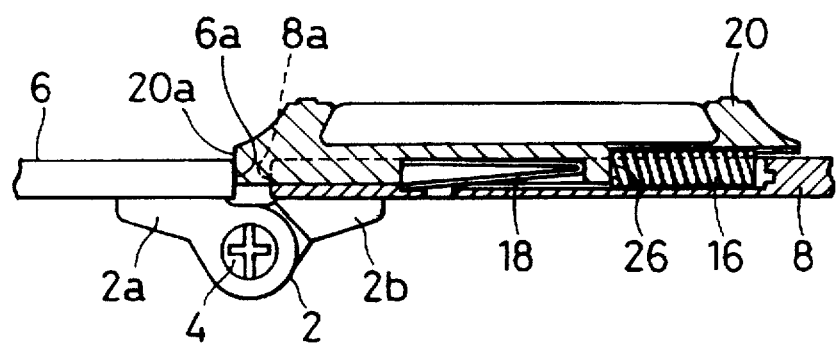
FIGS. 2A and 2B are longitudinal sectional views showing a temple which is in an attitude in a normal use position and in a position spread apart from that shown in FIG. 2A respectively.

FIGS. 1 to 4D show a first embodiment of the present invention. FIG. 1 shows a perspective view of half of an eyeglasses frame of a first embodiment. FIG. 2A is a sectional view showing a temple which is brought into an attitude of a normal use position. FIG. 2B is a sectional view showing the temple which is further spread from the position shown in FIG. 2A. FIGS. 3A to 3D show an unassembled cover, and FIGS. 4A to 4D show an unassembled temple.

A hinge body 2 is formed by leaves 2a and 2b which are coupled with each other by a screw 4 and are capable of opening and closing. The leaves 2a and 2b are brazed to inner sides of a rim 6 and a base end portion of a temple 8 respectively. A side of the temple 8 which is closer to the rim 6 is called a base end slide. Brazed positions of the hinge body 2, the rim 6 and the temple 8 are so set that a clearance is defined between end surfaces 6a and 8a of the rim 6 and the base end side of the temple 8 in the normal use position shown in FIG. 2A.

An opening 10 communicating with the base end surface 8a is provided on an outer side of the base end portion of the temple 8 (a slide connected with the hinge body 2 is called an inner side, and a side opposite thereto is called an outer side) as shown in FIGS. 4A–4D. The opening 10, which is an elastic member compartment for holding a coil spring 16 and a plate spring 18, is provided with a step 12 on its bottom surface for defining a higher base end part side. A groove 14 is formed on an inner side surface of the opening 10, serving as a guide member for a cover 20.

Figure 5A:
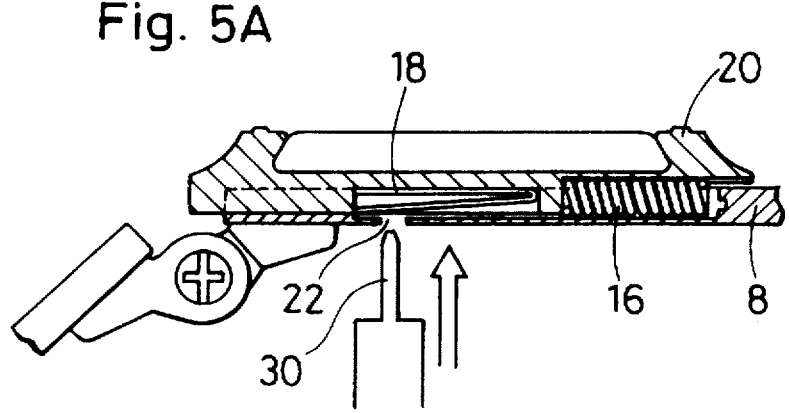
FIGS. 5A and 5B are longitudinal sectional views showing a method of detaching the cover from an assembled state.
Figure 5B:
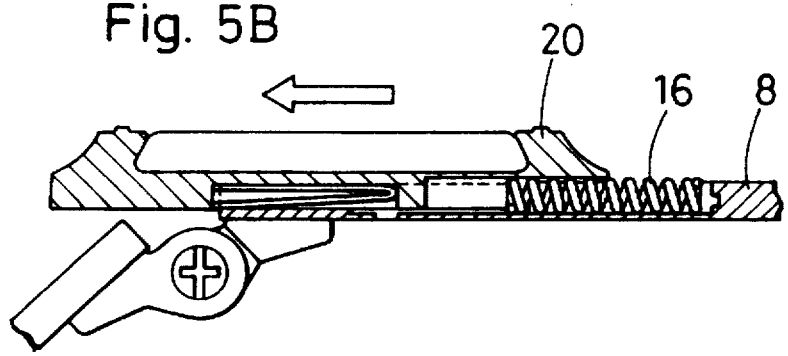

The opening 10 is also provided with a hole 22 on its bottom surface, so that a pin can be inserted therein for pushing one of open forward ends of the plate spring 18 from the exterior thereby disengaging the plate spring 18 from the step 12 as shown in FIGS. 5A and 5B.

The cover 20, which is provided with a groove 24 on its side surface, is inserted in the opening 10 provided on the base end surface 8a of the temple 8, guided by the guide member 14 and slidably mounted on the base end portion of the temple 8. The cover 20 is also provided with a working face 26 for pushing the coil spring 16 on its forward end side (the right side in FIG. 3C), while a concave part 28 is provided on its base end side for holding the plate spring 18 as shown in FIGS. 2A and 2B.

A depression can be formed on an upper surface of the cover 20, so that an ornamental member 20b can be engaged in and fixed to the depression.

Figure 2B:
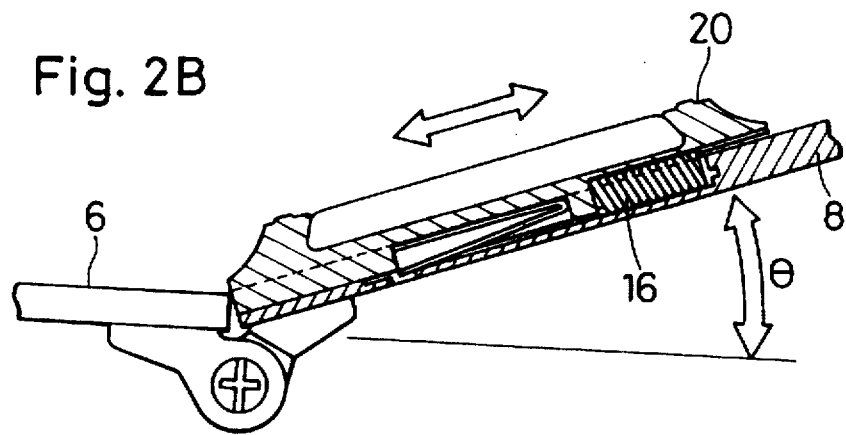

In an assembled state shown in FIG. 2A, the coil spring 16 is held in a compressed condition between a forward end side of the elastic member compartment of the temple 8 and the working face 26 of the cover 20. The plate spring 18, which is folded in two, is held in the concave part 28 of the cover 20 so that a side closer to the base end portion of the temple 8 is open. One (the lower one in FIG. 2A) of two open forward ends of the plate spring 18 is engaged with the step 12 provided on the bottom surface of the elastic member compartment, for preventing the cover 20 from being slide toward the base end side of the temple 8 and slipping off.

Dimensions of the respective parts are so set that an outer end surface 20a on the base end side of the cover 20 is in contact with the forward end surface 6a of the rim 6 in the normal use position.

FIG. 2B shows the temple 8 which is further outwardly opened from the normal use position by an angle θ. As the temple 8 is spread from the normal use position, the cover 20 is pushed by the forward end surface 6a of the rim 6, to be slid toward the forward end side (the right side in FIG. 2B) along the guide member 14 of the temple 8 while compressing the coil spring 16 against its spring force. The angle θ is that at the position where the forward end surface 6a of the rim 6 is in contact with the base end surface 8a of the temple 8, and the temple 8 cannot be spread beyond the angle θ.

A method of assembling this embodiment is now described. The coil spring 16 is positioned in the elastic member compartment of the opening 10 of the temple 8, while the plate spring 18 is introduced into the concave part 28 of the cover 20 while opening the side closer to the base end portion. The cover 20 is slid along the guide member 14, and pushed while compressing the coil spring 16 by the working face 26 of the cover 20. When the cover 20 is pushed until one (the lower one in FIG. 2A) of the open forward ends of the plate spring 18 is engaged with the step 12, the cover 20 is fixed to the temple 18.

FIGS. 5A and 5B show a method of detaching the cover 20 from the temple 8. When a pin 30 is inserted in the hole 22 to push one of the forward ends of the plate spring 18 as shown in FIG. 5A, the plate spring 18 is disengaged from the step 12, so that the cover 20 can be pushed toward the base end side (the left side in FIG. 5B) due to the elasticity of the coil spring 16, to achieve the position shown in FIG. 5B. Thereafter, the cover 20 is manually slid toward the base end side, so that the same is detached from the temple 8.

FIGS. 6A to 8D show a second embodiment of the present invention. While the plate spring 18 is employed for preventing the cover 20 from slipping out from the temple 8 in the first embodiment, a screw 58 is employed in the second embodiment.

An opening 50 provided on an outer side of a base end portion of a temple 48 communicates with a base end surface in a similar manner to the first embodiment, serving as an elastic member compartment for a coil spring 16 as well as a guide member for a cover 60 with a groove 14 provided on its inner side surface. A screw hole 52 is provided on a bottom surface of the opening 50.

The cover 60 comprises a working face 26 for pushing the coil spring 16 on a forward end side of its bottom surface, similar to the first embodiment. Another working face 49 is provided on a base end portion side of the bottom surface of the cover 60, to be engaged with the screw 58 which is fitted with the screw hole 52 of the temple 48.

Figure 6A:
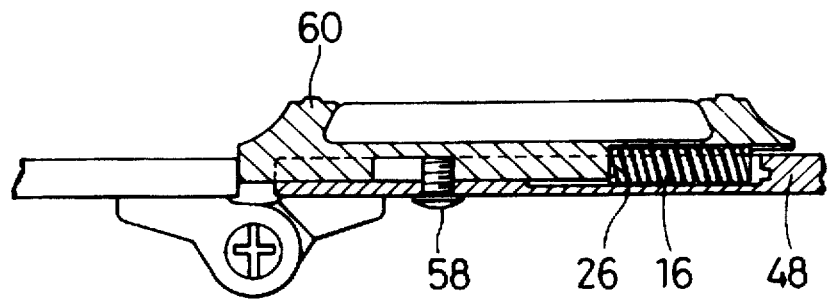
FIGS. 6A and 6B are longitudinal sectional views showing a temple which is in an attitude in a normal use position of a second embodiment of the present invention and in a position spread apart from that shown in FIG. 3A respectively.

In an assembled state shown in FIG. 6A, the coil spring 16 is held in a compressed state between a forward end of the elastic member compartment of the opening 50 and the working face 26 of the cover 60, similar to the first embodiment. In order to prevent the cover 60 from slipping off, the screw 58 is fitted with the screw hole 52, and engaged with the working face 49 of the cover 60.

Figure 6B:
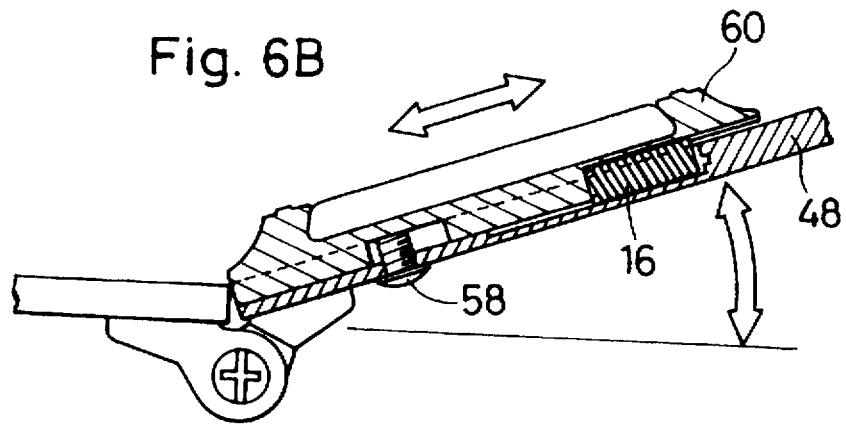

When the temple 48 is further spread from a normal use position, the cover 60 is slid toward the forward end of the temple 48 along the guide member 14 as shown in FIG. 6B.

A method of assembling this embodiment is now described. The coil spring 16 is positioned in the elastic member compartment of the opening 50, and the cover 60 is slid along the guide member 14 of the temple 48, to be pushed while compressing the coil spring 16 by the working face 26 of the cover 60. The screw 58 is fitted with the screw hole 52 when the working face 49 of the cover 60 passes the position of the screw hole 52, thereby completing the assembling.

When the screw 58 is disengaged from the screw hole 52, the cover 60 can be slid to be detached from the temple 48.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An eyeglasses frame with spring hinges, said hinges comprising:

a hinge body pivotally coupling a temple to a rim with a clearance between a base end portion of said temple and a forward end of said rim being coupled therewith;

an elastic member;

an elastic member compartment having an opening provided on an outer side of said temple base end portion communicating with an outer end surface and holding said elastic member, a side portion of said opening serving as a guide member;

a cover closing said opening, being slidably supported by said guide member on a side portion thereof and having a working face for said elastic member on a surface opposed to said opening, an outer end surface of said cover on a base end portion side coming into contact with said forward end of said rim in a temple attitude in a normal use position; and stop means for preventing said cover from slipping off toward said base end side of said temple;

said elastic member being held in a compressed state between a forward end side in said elastic member compartment and said working face of said cover.

2. The eyeglasses frame with spring hinges in accordance with claim 1, wherein:

said stop means comprises a step provided on a bottom surface of said opening of said elastic member compartment defining a higher base end portion side, a concave part provided on a base end side of said cover, and a plate spring folded in two having two open forward ends, said plate spring being held in said concave part of said cover so that a side closer to said temple base end portion is open with one of said open forward ends being engaged with said step of said elastic member compartment.

3. The eyeglasses frame with spring hinges in accordance with claim 2, wherein:

a hole is provided on a position of a bottom portion around said step in said base end portion of said temple for receiving a pin being inserted from the exterior for pushing an end of said plate spring being engaged with said step.

4. The eyeglasses frame with spring hinges in accordance with claim 1, wherein:

said stop means comprises a screw hole provided on a bottom surface of said opening of said elastic member compartment, a screw fitted with said screw hole, and a working face for said screw provided on said base end side of said cover.

5. The eyeglasses frame with spring hinges in accordance with claim 1, wherein:

said elastic member is a coil spring.

* * * * *